US006950822B1

(12) United States Patent
Idicula et al.

(10) Patent No.: US 6,950,822 B1
(45) Date of Patent: Sep. 27, 2005

(54) TECHNIQUES FOR INCREASING EFFICIENCY WHILE SERVICING REQUESTS FOR DATABASE SERVICES

(75) Inventors: Sam Idicula, Foster City, CA (US); Eric Sedlar, San Francisco, CA (US); Nipun Agarwal, Santa Clara, CA (US); Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 284 days.

(21) Appl. No.: 10/304,478

(22) Filed: Nov. 25, 2002

Related U.S. Application Data

(60) Provisional application No. 60/424,543, filed on Nov. 6, 2002.

(51) Int. Cl.[7] .............................................. G06R 17/30
(52) U.S. Cl. ...................................... 707/10; 709/227
(58) Field of Search ................... 707/1–10, 100–104.1, 707/200–205; 709/203, 206, 227; 713/127, 713/130, 170, 185, 201; 717/127, 130; 380/37

(56) References Cited

U.S. PATENT DOCUMENTS

| 5,463,772 | A | 10/1995 | Thompson et al. | |
|---|---|---|---|---|
| 6,721,941 | B1 * | 4/2004 | Morshed et al. | 717/127 |
| 6,760,903 | B1 * | 7/2004 | Morshed et al. | 717/130 |
| 2002/0056025 | A1 | 5/2002 | Qui et al. | |
| 2002/0133484 | A1 | 9/2002 | Chau et al. | |
| 2002/0199001 | A1 * | 12/2002 | Wenocur et al. | 709/227 |
| 2003/0009694 | A1 * | 1/2003 | Wenocur et al. | 713/201 |

FOREIGN PATENT DOCUMENTS

EP        1 241 589 A2    9/2002

OTHER PUBLICATIONS

Chakraborty, Krishnendu, "The XML Garbage Collector", The Source for Developers, Sun Developer Network Site XP-002297849, Mar. 2002.
Written Opinion, Application No. PCT/US03/35551 (8 pages).
Current claims in PCT/US03/35551, pp. 20-23.
Wolfgang May, "Querying Linked XML Document Networks in the Web", The Eleventh International WWW Conference, May 7, 2002, XP002300873, Honolulu Hawaii, USA, http://www2002.org/CDROM/alternet/index-bytitle.html 8 pages.
International Search Report from PCT for International Application No. PCT/US03/35552 dated Nov. 8, 2004 (7 p).
Written Opinion from PCT for International Application No. PCT/US03/35552 dated Nov. 10, 2004 (6 p).
Current Claims in PCT Patent Application No. PCT/US03/35552.

* cited by examiner

*Primary Examiner*—Diane D. Mizrahi
(74) *Attorney, Agent, or Firm*—Christian A. Nicholes; Hickman Palermo Truong & Becker LLP

(57) ABSTRACT

Techniques for servicing requests for database services include maintaining at a database server an available set of one or more database session data structures. Each database session data structure holds information to support one session of one or more requests for database services over a communication connection that persists for one or more communications from one client. A database session data structure in the available set is not associated with any client currently connected to the database server. These techniques allow a database server to more efficiently service more numerous requests for database services, such as generated by communications using a stateless protocol like HTTP.

28 Claims, 3 Drawing Sheets

TECHNIQUES FOR INCREASING EFFICIENCY WHILE SERVICING REQUESTS FOR DATABASE SERVICES

CROSS REFERENCE TO RELATED APPLICATION

This application claims benefit of Provisional Appln. Ser. No. 60/424,543, filed Nov. 6, 2002, the entire contents of which is hereby incorporated by reference as if fully set forth herein, under 35 U.S.C. §119(e).

FIELD OF THE INVENTION

The present invention relates to servicing requests for database services, and in particular, to efficiently servicing multiple short-lived requests, such as delivered by stateless hypertext transfer protocol (HTTP) messages.

BACKGROUND OF THE INVENTION

The client-server model of computer process interaction is widely used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service or the host computer on which the process operates; similarly, the term "client" is conventionally used to refer to the process that makes the request or the host computer on which the process operates. As used herein, the terms "client" and "server" refer to the processes, rather than the host computers, unless otherwise clear from the context.

A database server provides database services in response to requests from a database client. For example, the database server writes data received in the request into one or more data containers in a particular database managed by the database server; or, the database server retrieves data from one or more of those containers that satisfy conditions specified in the request; or, it does both. In many circumstances the database client is a mid-tier application, distinct from the database server, which performs other services, such as accounting services, for one or more application users. The application itself may be configured for client-server operations, so that application users operate application clients that make application requests to an application server.

When a database client sends a request to a database server, the database server establishes a database session object to hold information related to providing database services to that client. The session object is a data structure that stores information that supports a session. A session is a related series of one or more requests for services made over a communication channel. The channel is typically established by the operating system of the host for the database server and that persists for one or more communications from the client, depending on the communications protocol used by the client.

The session information stored in the database session object may include any information well-known in the art. The session information may also include security information, such as identities of clients and users associated with a request, and access privileges associated with those users. The database session object may also contain references to the database and database schema associated with the request and the amount and location of memory areas on the database server host where processes and data associated with the session are cached.

As database servers are extended to support more options and communication protocols and security protocols, the amount of information stored in a database session object is increased. For example, to support database requests for hierarchical data, such as files and folders of a file system stored in a repository within the database, the database session object is extended to include information about a root container for the hierarchy and a document that contains configuration information about the hierarchy, such as an XML schema document. To associate users or files with attributes of those users or files, hash tables are often used; in such circumstances the database session object may include the hash tables.

As a result of the many important pieces of information stored in a database session object, a significant amount of database server and server host resources are consumed in generating the database session object. Consumption of central processing unit (CPU) processing cycles are especially significant, leading to a perceived increase in response time needed for the database to return a result. When a client ends its communication session with the database server, the associated database server object is deleted and resources assigned to the database session object are released.

While suitable for many purposes, establishing a new database session object for every user who causes requests for database services does suffer some disadvantages. For example, when there are many database users who connect to and disconnect from the database frequently, the resources consumed by the database server to establish and release database session objects can noticeably increase database server response time and therefore decrease database server performance.

To improve response time, some mid-tier applications establish a pool of connections with a database server. The connections in the pool are maintained and reused by the application as different application users join and exit the application. On the database server, relatively few database session objects are established. Those that are established are associated with the application for the long-lived connections in the pool. Each time a different user is associated by the application with one of the connections in the pool, the application sends some data to the database server that causes a new session to be created.

While suitable for many purposes, there are some disadvantages to relying on mid-tier applications to re-use a pool of long-lived connections to the database server. One disadvantage is that the mid-tier application must be developed to establish and maintain the pool of connections. This increases the cost of developing and testing mid-tier applications that use the database server.

Another disadvantage is that an excess of database session objects may be generated because, while each application establishes a pool for its optimal number of users, it is unlikely that all applications will need to support their optimal number of users at the same time. For example, five mid-tier applications each expect a optimal number of ten (10) and therefore each establishes a pool of ten (10) database connections. As a result, 50 database session objects are generated on the database server. At any one time, some of those applications have fewer than ten users; for example, four (4) applications may have four (4) users when one has nine (14) users—for a total of 30 users. While the number of users at each application varies, the number of used connections to the database actually varies only slightly around 30. Therefore 50 database session objects are established to serve 30 used connections. The database server resources consumed to maintain the 20 excess database session objects wastes valuable resources on the database server host. The application resources consumed to maintain the 20 excess connections wastes valuable resources on the hosts of the applications.

Another disadvantage of other approaches is an escalating reliance by database users on hypertext transfer protocol (HTTP) requests for database services. HTTP requests for database services are popular because a user with a common client (called a "web browser," or, simply, "browser,") can then request database services over the Internet even without a mid-tier application. In addition, HTTP has been extended by a protocol called web-based distributed authoring and versioning ("WebDAV") to support hierarchical operations over the internet that mimic popular file systems. However HTTP and WebDAV are stateless protocols that do not form communications channels that persist beyond a few messages. Thus, each few messages from a web browser containing requests for database services involve the creation and subsequent release of a database session object by the database server. A single user may generate dozens of messages at one sitting which involve several database connections. The repeated creation and release of database session objects consumes valuable database server resources. Such HTTP-based requests are expected to proliferate over the next few years, further taxing database server resources and degrading database server performance.

Based on the foregoing there is a clear need for techniques that service requests for database services that do not suffer the disadvantages of the above approaches and that do not degrade database server performance.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Techniques are described for servicing requests for database services. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Techniques for servicing requests for database services include maintaining at a database server an available set of one or more database session data structures. Each database session data structure holds information to support one session of one or more requests for database services over a communication connection that persists for one or more communications from one client. However, a database session data structure in the available set is not associated with any client currently connected to the database server.

The techniques described hereafter allow a database server to more efficiently service more requests for database services, including database service requests generated by communications using a stateless protocol like HTTP.

Structural Overview

Figure 1:
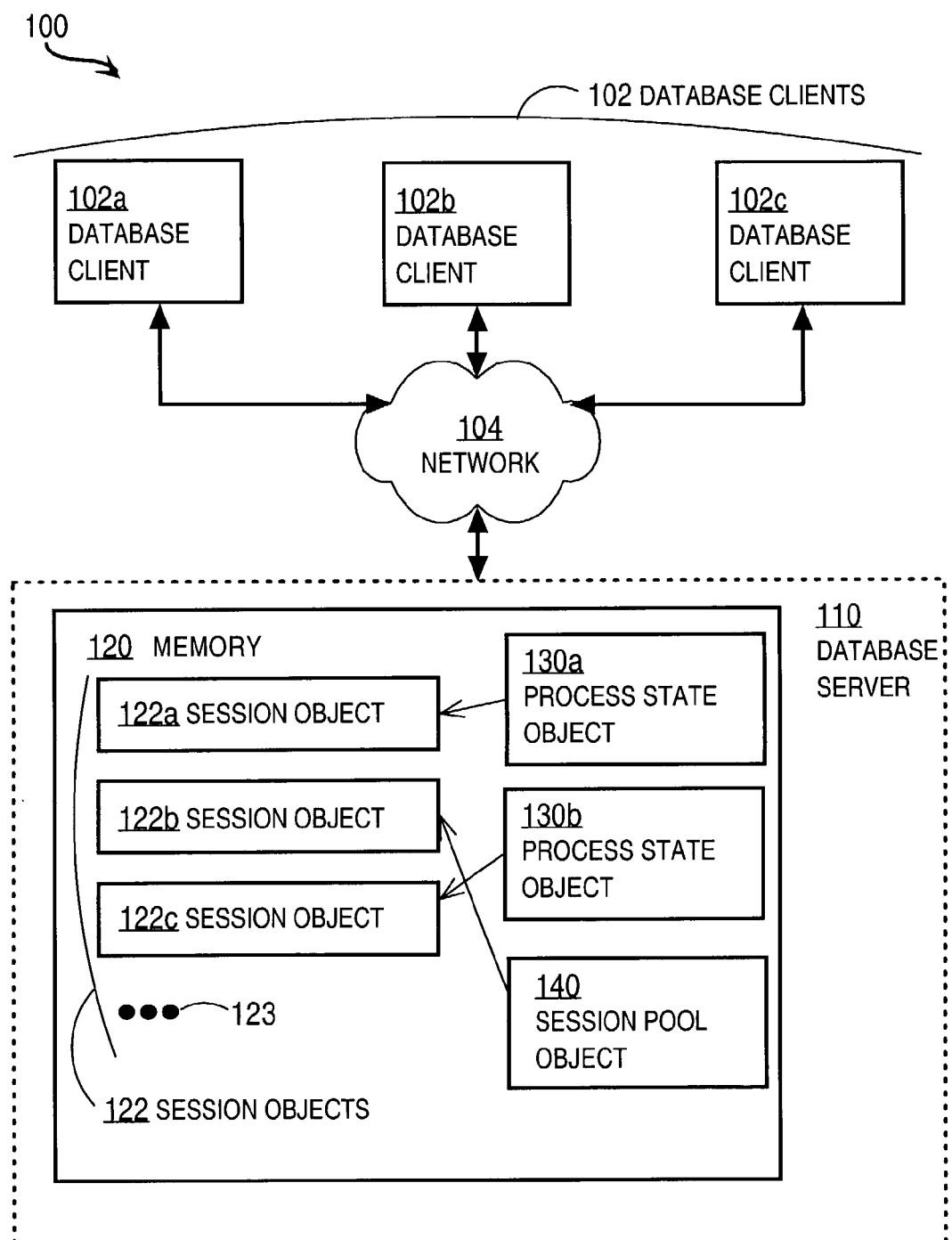
FIG. 1 is a block diagram that illustrates a system for handling numerous connections with clients for database services, according to an embodiment.

FIG. 1 is a block diagram that illustrates a system 100 for handling numerous connections with clients for database services, according to an embodiment. The system includes a database server 110 connected to a network 104. On or more database clients 102 are also connected to network 104. In the illustrated embodiment, three clients, 102*a*, 102*b*, 102*c* are connected to network 104. In other embodiments more or fewer clients 102 are connected to network 104.

The database clients 102 communicate with database server 110 using one or more communications protocols, such as open protocols HTTP and WebDAV and proprietary protocols provided by an enterprise that provides the database server and clients. In the illustrated embodiment the three database clients 102*a*, 102*b*, 102*c* communicate with the database server 110 through network 104. In some embodiments, one or more of clients 102 reside on the same host computer as server 110, so that such clients can communicate with the server 110 directly, without using the network 104.

The database server 110 includes memory 120 on the database server host computer, which is allocated for use by the database server 110. The database server 110 maintains several data structures in memory 120. Among the data structures maintained in memory 120 are zero or more session objects 122, one or more process state objects 130*a*, 130*b*, collectively referenced hereinafter as process state objects 130, and a session pool object 140. In object-oriented technologies, an object is a data structure that stores data that indicates one or more attributes or methods or both. An object is one instance of an object type that is defined in one or more object type data structures. In other embodiments, the data structures that are illustrated as objects in FIG. 1 need not be objects according to object-oriented technologies.

When a client connects with database server 110, a communication process on the server host handles the communications. In the illustrated embodiment, the communication process passes the database request to a database server communications process. A process state object 130 in the memory 120 is created when the database server communication process is created, and is associated with the database server communication process. The process state object 130 holds data indicating a connection with a client and methods for sending messages to and receiving messages from the client. The process state object includes data that associates each connection with a session object 122. In some embodiments, the host communication process and the database communication server are the same.

In the illustrated embodiment, session objects 122 include session objects 122a, 122b, 122c and zero or more additional session objects indicated by ellipsis 123. Data or methods, or both, relevant for each connection to a client are stored in the associated session object 122.

For example, in some embodiments, each session object 122 includes four types of information—types I, II, III, IV. Type I information is user information that indicates a user of the associated connection, the user's roles, and the user's privileges, among other information about the user. Type II information is current transaction information that indicates the current database command, such as the current structured query language (SQL) statement, of a set of commands that constitute a database transaction, and indicates other information about the database transaction requested.

Type III information is cached information that is moved into the session object from persistent storage for improved performance because the information is used frequently during a session. Examples of cached information include hash tables that contain access control lists (ACLs), and database configuration information used for documents stored hierarchically in the database. Hash tables are used to access information about a named item, given the name of the item. An ACL is used to associate a set of privileges with each user for all authorized users. Database configuration information is used, for example, to associate default properties of files and folders stored in the database with the names and file extensions of those files and folders.

Type IV information includes Pins for objects in shared memory A Pin is some information associated with an object to indicate that a session is currently using the object. The database server moves some database objects from persistent storage to a shared portion of memory where those objects are accessible by several processes, including processes associated with several different sessions. The Pins indicate the database objects in shared memory to which the session has access. The Pin indicates that the object should not be purged from the shared memory. The database objects include cursors, database schema objects, and XML schemas, among others. A Cursor is an area in shared memory where a parsed SQL statement and information for processing that statement are kept. Database schema objects refer to database objects that belong to a particular user, such as tables, views, and stored procedures. An XML schema is a data model for XML documents of a certain type. The XML schema contains information about the types of the elements, the attributes of each type, and the hierarchical relationships among elements in XML documents of that type.

According to the illustrated embodiments, the system 100 also includes the session pool object 140. The session pool object 140 includes data that indicates zero or more available session objects 122 that are not associated with any client currently connected to the database server. The data that indicates an available session object is represented in FIG. 1, for an example embodiment, by an arrow pointing from session pool object 140 to session object 122b. The session objects 122, indicated by the session pool object 140, are not among session objects 122 associated with a currently connected client by a process state object 130. The data that indicates a session object associated with a currently connected client in a process state object 130 is represented in FIG. 1, for an example embodiment, by arrows pointing from process state objects 130a, 130b to session objects 122a, 122c, respectively.

Functional Overview

According to the illustrated embodiments, session objects are not deleted when a connection ends; but, instead, are saved as available session objects and reused with new connections. In the illustrated embodiment, the session pool object 140 indicates the available session objects.

By retaining available session objects 122 indicated by the session pool object 140 in memory 120, the resources that would be consumed to delete and recreate the session object 122 when connections are ended and started, respectively, are conserved. When a new client connects to the database server 110 and is associated with an extant session object 122, only the type I and type II information is typically updated. The type III and type IV information already in the session object is often retained unchanged. Therefore, the resources that would be consumed to generate the type III and type IV information are also conserved. The saved resources become substantial when clients request database services in multiple short-lived connections.

Maintaining a session pool on the database server is also an advantage when many applications use the same database server. The applications need not consume resources to maintain their own pools and the database server need not consume resources to maintain the pool of connections with all those applications. In addition, the total number of session objects to support the maximum number of simultaneous users of the database is often less than the total number of session objects to support the maximum number of simultaneous users on each application separately, because it is unlikely that all applications experience their maximum number of users at the same time.

Method for Servicing Requests with Available Session Objects

Figure 2:
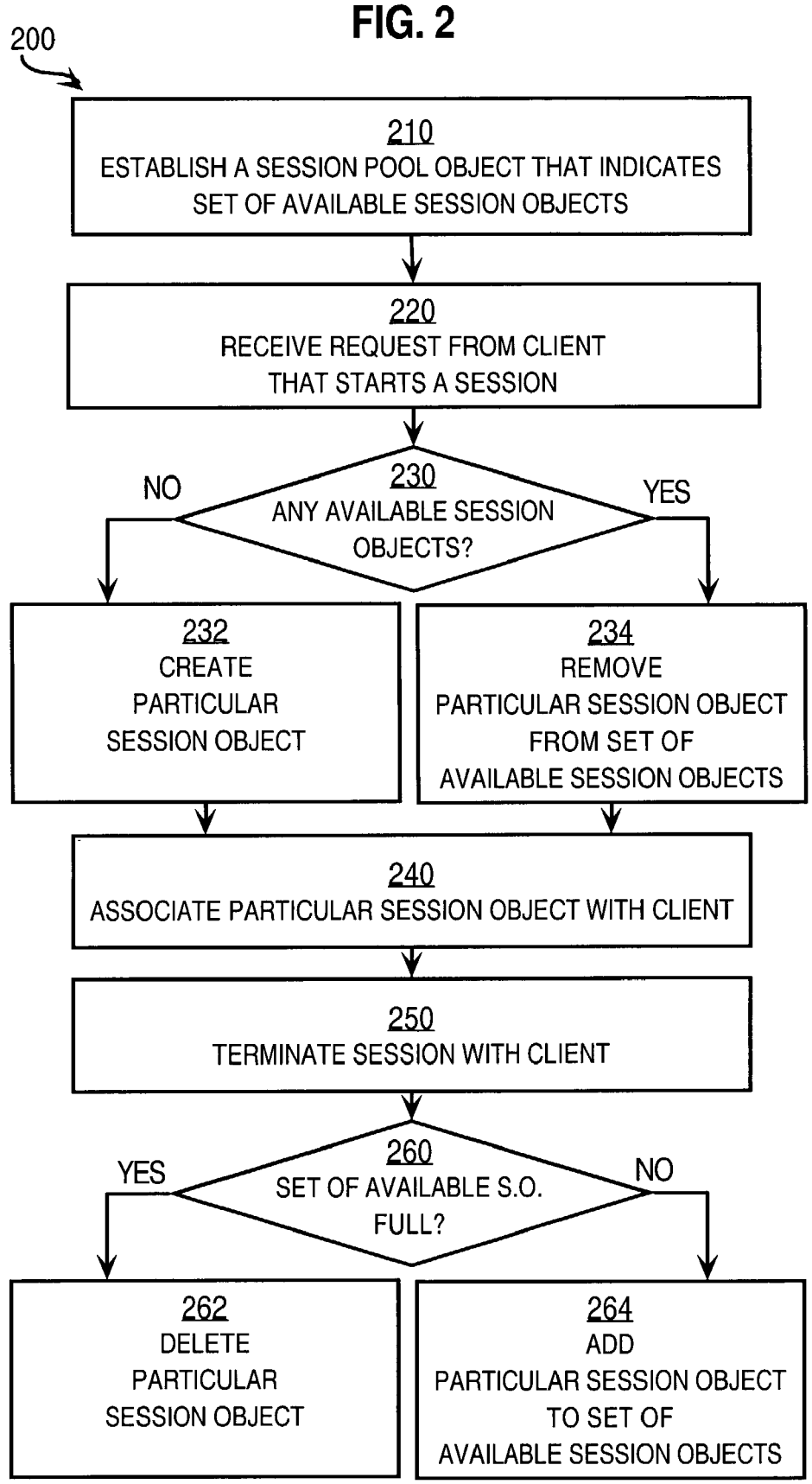
FIG. 2 is a block diagram that illustrates at a high level, a method at a database server for maintaining a pool of available session objects, according to an embodiment.

FIG. 2 is a block diagram that illustrates, at a high level, a method 200 for maintaining a pool of available session objects to service requests for database services. Though steps are depicted in FIG. 2 in a particular order, in other embodiments the steps may be performed in a different order, or overlapping in time.

In step 210, a session pool object 140 is established, which indicates a set of available session objects, if any, which are not associated with a current connection to a client. In other embodiments, other methods of maintaining an available set of one or more database session objects are employed, during step 210. For example, each session object may include an attribute that indicates its availability. The attribute may be used to indicate a client or connection with which the session object is associated. The attribute may then contain a null value when the session object is not associated with any client or connection. A null value for this attribute therefore indicates that the session object is available.

In some embodiments, the session pool object 140 includes a first attribute that contains a value indicating a number of session objects that are available and a second attribute that indicates a list of the session objects that are available. The data that indicates each session object in the list may be one or more properties of the session object. In one embodiment, the data that indicates each session object is the name of the session object. In another embodiment, the data that indicates each session object is an address of the first byte of the session object in memory 120.

In some embodiments, step 210 is performed automatically when an instance of the database server is started. In some embodiments, step 210 is performed in response to a command issued manually by a database administrator or by an application. In some embodiments, the session pool object 140 is created when the first session object 122 is released, as described below with reference to step 264.

In some embodiments, step 210 includes creating a set of one or more available session objects 122 and storing the number and list of the newly created session objects 122 in the session pool object 140 when the session pool object 140 is created. In some embodiments, no available session objects 122 are created when the session pool object 140 is created, so that the number of available session objects is initially zero and the list is initially empty.

In step 220, a request is received from a client that starts a session. For example, a request is received from database client 102*a* for database services. The database server determines whether a session has already been created for this client by checking the contents of process state object 130. If a session is already created for this client, a session object 122 associated with the client is indicated in the process state object 130; and that session object 122 is used. If the process state object 130 does not contain data indicating this client 102*a*, then a new session starts, and control passes to the next steps in the method which associate a session object 122 with the client 102*a* in process state object 130. In many embodiments, if the request from client 102*a* is delivered using HTTP or WebDAV, then process state object 130 does not contain data indicating this client 102*a*, and a new session starts. When a request is received from a client that starts a session, control passes to step 230.

In step 230, it is determined whether there are any available session objects that are not associated with a connected client. For example, the session pool object 140 is accessed to determine if the number of available session objects is greater than zero. If not, control passes to step 232 to create a new session object. If there is a set of one or more available session objects, then control passes to step 234 to select one.

In step 234, one of the available session objects in the set is selected for use with the client 102*a*. For example session object 122*b* is selected. In the illustrated embodiment, the selected session object is removed from the set by deleting the list element indicating the selected session from the session pool object 140, and by decrementing the number of available session objects in the session pool object 140.

In step 232, a new session object is created. Any method known in the art for creating the new session object may be used. For example, space in memory 120 is allocated for session object 122*c* and information for types I, II, III and IV, appropriate for client 102*a*, is generated and stored in session object 122*c*.

In step 240, the session object for the client is associated with the client. For example, the session object 122*b*, selected from the session pool object 140 during step 234, is associated with the client 102*a* in the process state object 130. In an alternate example, the session object 122*c*, created during step 232, is associated with the client 102*a* in the process state object 130. During step 240, type I and type II information is generated, if necessary, to refresh and replace that information already in the session object, if any.

In step 250, the session with this client terminates. Under some protocols, termination occurs after the database server has performed one or more database operations based on one or more requests beginning with the request received in step 220, and then the database server either receives an explicit request from the client 102*a* to terminate the connection, or an elapsed time since the last request was received has exceed a time-out threshold. Under some protocols, such as HTTP version 1.0, termination occurs after the database server has performed one or more database operations based on the request received in step 220. In some embodiments, all data in process state object 130 related to the terminating client is deleted during step 250.

In step 260, it is determined whether the set of available session objects is full. In some embodiments, there is no limit placed on the number of available session objects that can be retained in memory, so the set is never full. The set will eventually grow to a number of session objects that is less than or equal to the greatest number of sessions simultaneously supported by database server 110. However, in some embodiments, a maximum allowable limit on available session objects is set to prevent the database server from devoting too many resources to retain session objects that are not in use. Once the number, or size, of session objects 122 that are available reaches or exceeds this maximum allowable limit, the set of available session objects is considered full. In some embodiments, step 260 is performed by accessing the data in session pool object 140 to determine the number or size of the available session objects. In embodiments in which the session pool object 140 is absent, the set of available session objects is considered not full. In some embodiments, the session pool object 140 is absent until the first session object is released, as described below with reference to step 264.

If it is determined in step 260 that the set of available session objects is full, then control passes to step 262. In step 262, the session object associated with the terminating client 102*a* in process state object 130 is deleted. For example, session object 122*c* associated with client 102*a* in process state object 130 is deleted. In some embodiments, all data in process state object 130 related to the terminating client is also deleted during step 262.

If it is determined in step 260 that the set of available session objects is not full, then control passes to step 264. In step 264, the session object associated with the terminating client 102*a* in process state object 130 is added to the set of available session objects. For example, session object 122*c* associated with client 102*a* in process state object 130 is added to the list of available session objects and the number of available session objects is incremented. In some embodiments, all data in process state object 130 related to the terminating client is also deleted during step 264.

In some embodiments, the session pool object 140 may be absent until the first session object 122 is released. In these embodiments, step 264 includes a step to determine whether the session pool object 140 exists in memory 120. If the session pool object 140 does not exist, then it is created during step 264. At creation during step 264, the number of available session objects is set to one, and the list of session objects includes data indicating the session object of the terminating client. For example the list of session objects includes data indicating session object 122*c*.

Using these steps, a pool of session objects is maintained on the database server, which reduces the resources consumed to create and delete session objects for multiple short-lived connections to database clients.

Example Use of Method

To further illustrate the operation of the techniques presented here, it is assumed that three clients 102a, 102b, 102c communicate with database server 110 using HTTP to request database services. It is further assumed, for purposes of illustration, that the current instance of database server 110 has recently started and that no session objects 122 have yet been created in memory 120. It is further assumed, for purposes of illustration, that process state object 130 has been created but that it contains no data indicating any client or connection, and that session pool object 140 has been created and contains data indicating a number of available session objects is zero and the list of available session objects is empty.

When an HTTP1.0 request for database services is received from database client 102a, a new session is started as in step 220. In step 230, it is determined by accessing the session pool object 140 that there are no available session objects. Control passes to step 232 and session object 122a is created. Data indicating session object 122a in association with client 102a is added to process state object 130.

Before the connection with client 102a is closed, HTTP requests for database services are received from database client 102b and then 102c, starting two new sessions. In step 230, it is determined by accessing the session pool object 140 that there are no available session objects, for both new sessions. Control passes to step 232 for both sessions, and session objects 122b and 122c are created. Data indicating session object 122b in association with client 102b, and session object 122c in association with client 102c, are added to process state object 130.

It is assumed, for purposes of illustration, that the server 110 completes the services requested by client 102b before completing the services requested by clients 102a or 102c. Since the request was sent under HTTP 1.0, completing the services terminates the connection. In step 250, the session with client 102b is terminated. The session pool object 140 still indicates no available session objects, so it is determined in step 260 that the set is not full. Control passes to step 264. In step 264, the session object 122b is added to the list and the number of available session objects is incremented to 1. Data indicating client 102b is deleted from process state object 130. At this moment in time, the session objects indicated by the process state object 130 and the session pool object 140 are as indicated by the arrows emanating from objects 130, 140 in FIG. 1.

It is further assumed, for purposes of illustration, that client 102b initiates another HTTP 1.0 request for database services before the database server 110 completes the services being performed for clients 102a and 102c. In step 220, the request from client 102b is received at server 110. Because this is a new connection, this request initiates a new session. Control passes to step 230.

In step 230, data indicating one available session object is found in session pool object 140, so control passes to step 234. In step 234, the only available session object, session object 122b, is selected from the list of available session objects in session pool object 140. Session object 122b is removed from the list; and the number of available session objects is decremented to zero. In step 240, session object 122b is associated with client 102b in process state object 130. The type III and type IV information is reused that is already in the session object 122b. Because the same client has been associated with session object 122b as the last time session object 122b was used, the type I information in the session object can be reused also, in whole or in part.

As shown by this example, session object 122b is not deleted and recreated just because the client 102b associated with the session object 122b has terminated its connection. Consequently, substantial resources are saved that would have been consumed in deleting and reconstructing the session object 122b.

Hardware Overview

Figure 3:
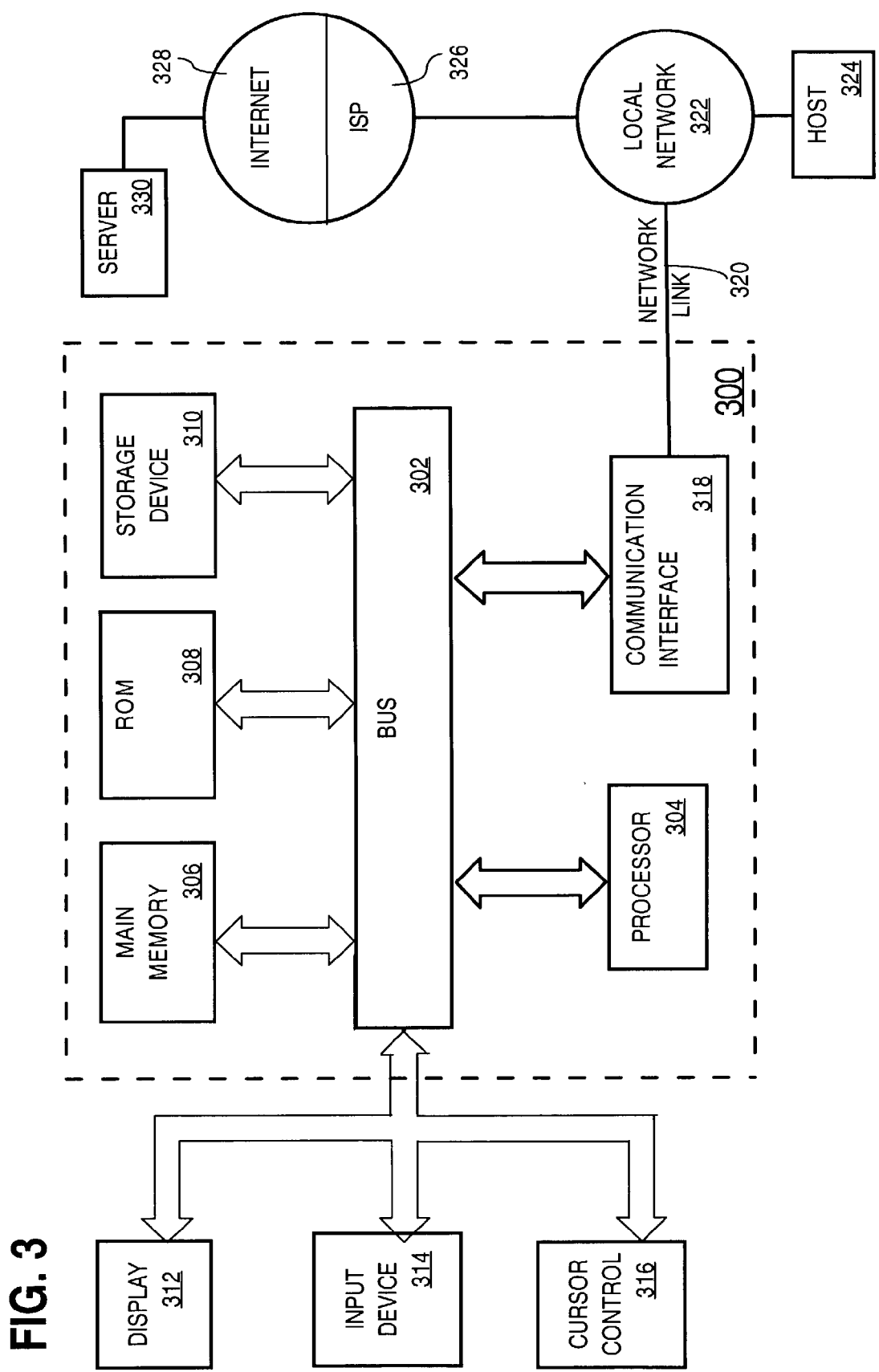
FIG. 3 is a block diagram that illustrates a computer system upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method for servicing requests for database services, the method comprising the step of:
   creating at a database server an available set of one or more database session data structures,
   wherein
      each database session data structure holds information to support one session of one or more requests for database services over a communication connection that persists for one or more communications from one client, and
      a database session data structure in the available set is not associated with any client currently connected to the database server.

2. The method of claim 1, further comprising the steps of:
   receiving, from a client, a request that opens a session;
   removing a particular database session data structure from the available set; and
   associating the particular database session data structure with the client.

3. The method of claim 2, wherein:
   the method further comprises the step of determining whether the database server has an available set; and
   said steps of removing the particular database session data structure and associating the particular database session data structure with the client are performed only if it is determined that the database server has an available set.

4. The method of claim 3, further comprising, if it is determined that the database server does not have an available set, then performing the steps of:
   creating a new database session data structure; and
   associating the new database session data structure with the client.

5. The method of claim 2, said step of receiving the request comprising the step of receiving a stateless request that establishes a communication connection that persists for no more than one communication from a particular client.

6. The method of claim 5, wherein the stateless request is one of a hypertext transfer protocol (HTTP) request and a web-based distributed authoring and versioning (WebDAV) request that extends HTTP.

7. The method of claim 1, further comprising
   terminating a session with a client that is associated with a particular database session data structure; and
   adding the particular database session data structure to the available set.

8. The method of claim 7, said step of adding the particular database session data structure further comprising the step of removing an association between the particular database session data structure and the client.

9. The method of claim 7, said step of adding the particular database session data structure further comprising the steps of:
   determining whether the database server has an available set; and
   if the database server does not have an available set, then creating an available set with the particular database session data structure.

10. The method of claim 7, wherein:
    the method further comprises the step of determining whether the available set has a maximum number of database session data structures; and said step of adding the particular database session data structure to the available set is performed only if it is determined that the available set has less than the maximum number of database session data structures.

11. The method of claim 7, further comprising, if it is determined that the available set has a maximum number of database session data structures, then performing the step of releasing the particular database session data structure.

12. The method of claim 7, said step of terminating the request comprising the step of sending a response to a stateless request that establishes a communication connection that persists for no more than one communication from a particular client.

13. The method of claim 12, wherein the stateless request is one of a hypertext transfer protocol (HTTP) request and a web-based distributed authoring and versioning (WebDAV) request that extends HTTP.

14. The method of claim 1, said step of maintaining the available set further comprising the step of establishing an available set data structure that holds data that indicates:
 a number of zero or more database session data structures that are not associated with any client; and
 one or more properties for each of the number of the database session data structures that are not associated with any client.

15. A computer-readable medium carrying one or more sequences of instructions for servicing requests for database services, wherein execution of the one or more sequences of instructions by one or more processors causes the one or more processors to perform the step of:
 creating at a database server an available set of one or more database session data structures,
 wherein
  each database session data structure holds information to support one session of one or more requests for database services over a communication connection that persists for one or more communications from one client, and
  a database session data structure in the available set is not associated with any client currently connected to the database server.

16. The computer-readable medium of claim 15, wherein execution of the one or more sequences of instructions further causes the one or more processors to perform the steps of:
 receiving a request from a client to open a session;
 removing a particular database session data structure from the available set; and
 associating the particular database session data structure with the client.

17. The computer-readable medium of claim 16, wherein: execution of the one or more sequences of instructions further causes the one or more processors to perform the step of determining whether the database server has an available set; and
 said steps of removing the particular database session data structure and associating the particular database session data structure with the client are performed only if it is determined that the database server has an available set.

18. The computer-readable medium of claim 17, wherein execution of the one or more sequences of instructions further causes the one or more processors, if it is determined that the database server does not have an available set, to perform the steps of:
 creating a new database session data structure; and
 associating the new database session data structure with the client.

19. The computer-readable medium of claim 16, said step of receiving the request comprising the step of receiving a stateless request that establishes a communication connection that persists for no more than one communication from a particular client.

20. The computer-readable medium of claim 19, wherein the stateless request is one of a hypertext transfer protocol (HTTP) request and a web-based distributed authoring and versioning (WebDAV) request that extends HTTP.

21. The computer-readable medium of claim 15, wherein execution of the one or more sequences of instructions further causes the one or more processors to perform the steps of:
 terminating a session with a client that is associated with a particular database session data structure; and
 adding the particular database session data structure to the available set.

22. The computer-readable medium of claim 21, said step of adding the particular database session data structure further comprising the step of removing an association between the particular database session data structure and the client.

23. The computer-readable medium of claim 21, said step of adding the particular database session data structure further comprising the steps of:
 determining whether the database server has an available set; and
 if the database server does not have an available set, then creating an available set with the particular database session data structure.

24. The computer-readable medium of claim 21, wherein:
 execution of the one or more sequences of instructions further causes the one or more processors to perform the step of determining whether the available set has a maximum number of database session data structures; and
 said step of adding the particular database session data structure to the available set is performed only if it is determined that the available set has less than the maximum number of database session data structures.

25. The computer-readable medium of claim 21, wherein execution of the one or more sequences of instructions further causes the one or more processors, if it is determined that the available set has a maximum number of database session data structures, to perform the step of releasing the particular database session data structure.

26. The computer-readable medium of claim 21, said step of terminating the request comprising the step of sending a response to a stateless request that establishes a communication connection that persists for no more than one communication from a particular client.

27. The computer-readable medium of claim 26, wherein the stateless request is one of a hypertext transfer protocol (HTTP) request and a web-based distributed authoring and versioning (WebDAV) request that extends HTTP.

28. The computer-readable medium of claim 15, said step of maintaining the available set further comprising the step of establishing an available set data structure that holds data that indicates:
 a number of zero or more database session data structures that are not associated with any client; and
 one or more properties for each of the number of the database session data structures that are not associated with any client.

* * * * *